United States Patent [19]

Duquesne

[11] 3,856,071

[45] Dec. 24, 1974

[54] DEVICE FOR DETACHING TIRE BEADS FROM A WHEEL RIM
[75] Inventor: Victor Duquesne, Antwerpen, Belgium
[73] Assignee: Coulter Electronics Inc., Hialeah, Fla.
[22] Filed: May 3, 1973
[21] Appl. No.: 356,930

[30] Foreign Application Priority Data
May 9, 1972 Belgium .............................. 51885

[52] U.S. Cl. ............................................. 157/1.26
[51] Int. Cl. ........................................... B60c 25/06
[58] Field of Search ........................... 157/1.17, 1.26

[56] References Cited
UNITED STATES PATENTS
1,447,113   2/1923   Woodhall ........................... 157/1.26
3,426,827   2/1969   Whited et al. ...................... 157/1.26

Primary Examiner—Othell M. Simpson
Assistant Examiner—Harold P. Smith, Jr.
Attorney, Agent, or Firm—Ulle C. Linton

[57] ABSTRACT

The device is used for detaching the tire beads from a wheel rim. The wheel is placed slanting with respect to a backing plate provided with a protruding guiding element and with a fulcrum located at a certain distance from the guiding element, both in view of guiding the wheel when a pressure blade which is rigidly attached to a driving means moves in a straight line towards aforesaid backing plate and presses against the tire in order to detach the tire bead which adheres to the wheel, in the course of which operation the wheel pivots around aforesaid fulcrum and over aforesaid guiding element in the direction of the backing plate.

4 Claims, 2 Drawing Figures

DEVICE FOR DETACHING TIRE BEADS FROM A WHEEL RIM

This invention is concerned with a device for detaching tire beads from a wheel rim when they adhere to the latter, after which the tire is removed from the wheel by means of a further, well known device.

A device is already known for detaching tire beads from a wheel rim, whereby the wheel is placed upright against a fixed vertical backing plate and a pressure blade is moved in a horizontal straight line, thus exerting pressure upon the tire. Under these circumstances the pressure blade passes over the edge of the wheel rim whilst remaining at a certain distance from the deep hollow of the rim, thus detaching the tire bead as efficiently as possible.

In the course of this operation however, the pressure blade is in fact applied against the flank of the tire and not against the bead which adheres, so that in practice the bead is not always detached and the tire flank may eventually be torn.

In an improved device the fixed backing plate is horizontal and provided with a vertical pin upon which the rim which is located upon the backing plate is hooked. The pressure blade of this device is moved vertically and is mobile in the direction of the tire. In this case the blade is suspended so as to be able to swing in the direction of the tire, in such a manner that the blade follows the profile of the rim as it is lowered.

This device does however have the disadvantage that in its downward movement the blade rubs against the rim, damaging same. Moreover, the possibility exists of the tire bead getting jammed between the rim and the pressure blade, which can also cause damage to the tire and to the inner tube within the latter.

In order to eliminate these disadvantages and according to the main characteristic of the present invention, a device was built in which use is made of a vertical backing plate provided with a protruding guiding element. The wheel which is placed obliquely against the front edge of the backing plate, will swing against the latter and over aforesaid guiding element when subjected to the horizontal straight line advance of the pressure blade of the device during the detachment operation of the tire bead. This pressure blade is rigidly fixed to the mechanism which displaces it.

The main advantages offered by this novel device are that the number of constituant elements remains small and that there is no possibility of interference between the rim and the pressure blade in the course of the straight line movement of the latter, so that it becomes impossible for the tire bead to get crushed between the rim and the pressure blade. Any damage either to rim or to tire is consequently excluded. It should be noted that in the present case it is the wheel which follows the pressure blade and not the contrary as in the known device described above.

Merely as an example, and without the slightest intent of limitation, a more detailed description is given below of a preferred form of embodiment of a device according to the present invention. This description refers to the appended drawings in which.

Figure 1:
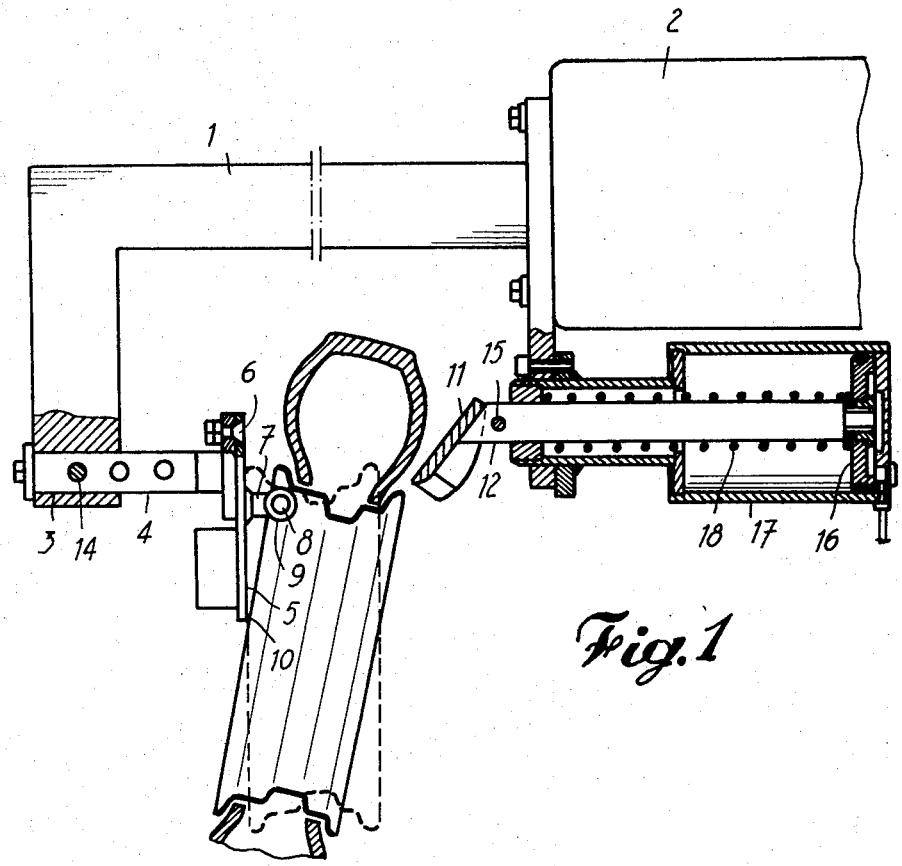
FIG. 1 shows a partially cutaway top view of the device.
Figure 2:
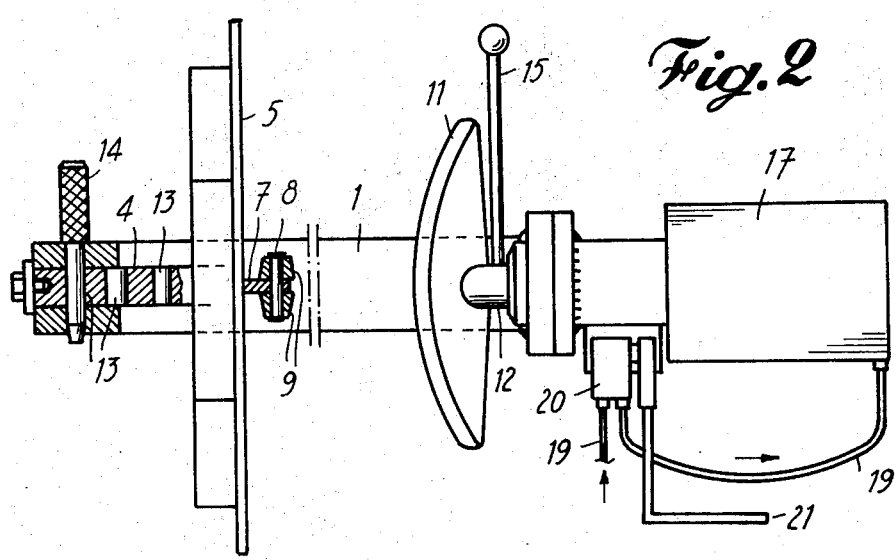
FIG. 2 shows a partially cutaway front view of same.

The device according to the present invention shall preferably be attached by means of a fixed davit 1 to a tire fitting and removing apparatus 2. This davit is provided with a square opening 3 into which is fitted an axially adjustable bar 4, one end of which is provided with a relatively high backing plate 5 which is fixed to aforesaid bar by means of a bolt 6. Solidly attached to backing plate 5 there is a finger 7 carrying a transverse shaft 8, the extremities of which protrude on either side of aforesaid finger. Upon each protruding end of this shaft, a roller 9 is fitted on a bearing. Together these two rollers longitudinally form a curve which corresponds approximately to that of a wheel rim of average diameter. The length of aforesaid finger 7 has been selected in such a way that rollers 9 are located at only a small distance from backing plate 5, so that it is possible to place a wheel initially in a slanting position with respect to aforesaid backing plate 5 by, on the one hand, letting one edge of the circumference of the rim rest on aforesaid rollers whilst, on the other hand, the wheel is pressed against the front edge or support 10 of the backing plate. In this case, edge 10 acts as fulcrum for the wheel whilst the rollers serve the purpose of guiding elements during the detachment of the tire. Opposite to aforesaid rollers 9 is located pressure blade 11 which can be displaced in a straight line towards these rollers and is fixed obliquely to a piston rod 12 with its front edge protruding. This front edge will follow a path the extension of which shall preferably touch the enveloping surface of the rollers. Bar 4 is provided with several successive openings 13, so that it becomes possible, by means of pin 14, to fix backing plate 5 in various positions according to the width of the wheel which has to be placed between backing plate 5 and pressure blade 11. By means of a handle 15 piston rod 12 can be rotated around its center line, so that pressure blade 11 can take up the position selected relative to the diameter of the tire which has to be detached. Aforesaid piston rod 12 is attached to a piston 16, located within an air cylinder 17. A return spring 18, which exerts pressure on piston 16, retains the pressure blade in its retracted position. Cylinder 17 is fed by an air pipe 19, which on the other hand is connected to a compressor (not shown), a pneumatic valve 20 which is operated by a pedal 21 being provided in abovementionned air pipe.

In order to detach a tire bead, the wheel is rolled between rollers 9 and pressure blade 11 of the device, by hooking the circumferential inner edge of the wheel behind rollers 9, whilst seeing to it that the opposite outer circumferential edge of the wheel locates slightly in front of the front edge of pressure blade 11 and that the wheel is pressed against front edge 10 of backing plate 5 (see FIG. 1). When the pedal 21 is now actuated, air enters cylinder 17 so that piston 16 with piston rod 12 and pressure blade 11 are moved in a straight line towards the wheel. As soon as the pressure blade contacts the bead of the tire, the wheel will swivel about edge 10 whilst moving towards backing plate 5 over rollers 9. Consequently the wheel will continually follow the advancing pressure edge of pressure blade 11 at a constant distance, without however interfering with the latter, so that the tire is detached without possibility of being jammed between the pressure blade and the rim. When pressure blade 11 has approximately reached the center of the rim, the foot pedal is released and the aforesaid pressure blade is pushed back by return spring 18, so that the wheel can then be turned around in order also to detach the opposite bead of the tire in the same manner.

It is perfectly obvious that the shape, dimensions and relative positioning of the above described elements may vary, providing they remain within the scope of the present invention, and that certain elements may even be replaced by others which fulfill the same purpose.

I claim:

1. Device for detaching the tire beads from a wheel rim, comprising a backing plate, guiding element protruding from said backing plate, a fulcrum on said backing plate spaced from said guiding element, said guiding element and fulcrum being positioned for guiding a wheel placed on a slant with respect to said backing plate, a pressure blade opposite said backing plate for engaging the tire bead, a driving means rigidly attached to said pressure blade for moving said pressure blade in a straight line towards said backing plate in order to detach the tire bead which adheres to the wheel, while swinging said wheel around said fulcrum and over said guiding element in the direction of said backing plate.

2. Device according to claim 1, wherein said pressure blade has a pressure edge which moves in a straight line in order to detach the tire bead and is mounted on said driving means opposite said protruding guiding element.

3. Device according to claim 1, wherein said protruding element comprises at least one roller.

4. Device according to claim 3, wherein said protruding element also includes a finger extending from said backing plate, a shaft extending laterally of said finger, said roller being two rollers on said shaft at opposite sides of said finger, said two rollers together being curved in their longitudinal direction so as to adapt correctly in the circumferential circular edge of a wheel rim.

* * * * *

UNITED STATES PATENT OFFICE
CERTIFICATE OF CORRECTION

Patent No. 3,856,071                    Dated Dec. 24, 1974

Inventor(s) Victor Duquesne

It is certified that error appears in the above-identified patent and that said Letters Patent are hereby corrected as shown below:

On the Title Page, Item "[73] Assignee: Coulter Electronics Inc., Hialeah, Fla." should be canceled.

Signed and sealed this 1st day of April 1975.

(SEAL)
Attest:

RUTH C. MASON
Attesting Officer

C. MARSHALL DANN
Commissioner of Patents
and Trademarks